(12) United States Patent
Fogarty et al.

(10) Patent No.: US 8,016,230 B2
(45) Date of Patent: Sep. 13, 2011

(54) FASTNER-FREE PRIMARY STRUCTURAL JOINT FOR SANDWICH PANELS

(75) Inventors: John H. Fogarty, Lake St. Louis, MO (US); Kevin M. Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 787 days.

(21) Appl. No.: 11/747,475

(22) Filed: May 11, 2007

(65) Prior Publication Data
US 2010/0006702 A1    Jan. 14, 2010

(51) Int. Cl.
*B64C 7/00* (2006.01)

(52) U.S. Cl. .............. 244/117 R; 244/131; 244/132

(58) Field of Classification Search .............. 244/119, 244/120, 131, 132, 133, 123.13, 123.3, 117 R
See application file for complete search history.

(56) References Cited

U.S. PATENT DOCUMENTS

| | | | | |
|---|---|---|---|---|
| 3,806,928 A * | 4/1974 | Costanza | ............. | 342/4 |
| 4,156,054 A | 5/1979 | Gurewitsch | | |
| 4,284,443 A * | 8/1981 | Hilton | ............. | 156/60 |
| 4,336,090 A * | 6/1982 | Hilton | ............. | 156/154 |
| 4,662,587 A * | 5/1987 | Whitener | ............. | 244/117 R |
| 4,793,727 A * | 12/1988 | Schmaling | ............. | 403/340 |
| 4,806,077 A * | 2/1989 | Bost | ............. | 416/226 |
| 4,966,802 A * | 10/1990 | Hertzberg | ............. | 428/119 |
| 6,149,749 A * | 11/2000 | McBroom | ............. | 156/94 |
| 6,220,651 B1 * | 4/2001 | Ehrlich | ............. | 296/186.1 |
| 6,253,530 B1 * | 7/2001 | Price et al. | ............. | 52/793.1 |
| 6,565,942 B2 * | 5/2003 | Anderson et al. | ............. | 428/73 |
| 7,182,291 B2 * | 2/2007 | Westre et al. | ............. | 244/119 |
| 7,291,373 B2 * | 11/2007 | Bartley-Cho et al. | ............. | 428/61 |
| 7,554,785 B2 * | 6/2009 | Hawley | ............. | 361/218 |
| 2004/0211151 A1 * | 10/2004 | Fanucci | ............. | 52/745.19 |
| 2010/0065688 A1 * | 3/2010 | Wood | ............. | 244/131 |

FOREIGN PATENT DOCUMENTS

| | | |
|---|---|---|
| FR | 2557932 | 7/1985 |
| GB | 1349200 | 3/1974 |
| WO | WO0009321 | 2/2000 |

OTHER PUBLICATIONS

PCT Intl Search Report and Written Opinion for Application No. PCT/US2008/063296, dated Feb 23, 2009, 14 pgs.

* cited by examiner

*Primary Examiner* — Galen Barefoot
(74) *Attorney, Agent, or Firm* — Lee & Hayes, PLLC

(57) ABSTRACT

Techniques for providing fastener-free primary structural joint for sandwich panels are disclosed. In one embodiment, a technique includes positioning a first panel having a first edge portion proximate a second panel having a second edge portion such that the first and second edge portions cooperatively form an interior recess on an interior side of the first and second panels, applying adhesive to at least one of the recessed interior side of the panel assembly and a plug configured to occupy the interior recess, inserting the plug into the interior recess, the plug including a cap that extends beyond the interior recess and overlaps adjacent portions of the first and second panels, applying adhesive to at least one of a splice and an exterior side opposite from the interior side, and attaching the splice on the exterior side.

19 Claims, 5 Drawing Sheets

FASTNER-FREE PRIMARY STRUCTURAL JOINT FOR SANDWICH PANELS

FIELD OF THE INVENTION

The present disclosure teaches techniques for joining panels, and more specifically, techniques for providing a fastener-free primary structural joint for sandwich panels.

BACKGROUND

Construction of aircraft components may present a number of unique challenges that may not be applicable in most other industries. In particular, aircraft components must be assembled in a manner to provide adequate strength while conforming to aviation design requirements. Therefore, joining aircraft panels, such as those on an aircraft fuselage or wings, present particular challenges.

Besides conforming to aviation design requirements for aerodynamics and strength, aircraft panel junctions must also remain within material tolerance. Additional factors such as ease of assembly may also be important when selecting a method of joining panels. Although some aspects may be particularly appurtenant for aviation, other industries such as building construction may benefit from improved techniques for assembling panels.

SUMMARY

Embodiments of techniques for providing fastener-free primary structural joint for sandwich panels are disclosed. In one embodiment, a technique includes positioning a first panel having a first edge portion proximate a second panel having a second edge portion such that the first and second edge portions cooperatively form an interior recess on an interior side of the first and second panels, applying adhesive to at least one of the recessed interior side of the panel assembly and a plug configured to occupy the interior recess, inserting the plug into the interior recess, the plug including a cap that extends beyond the interior recess and overlaps adjacent portions of the first and second panels, applying adhesive to at least one of a splice and an exterior side opposite from the interior side, and attaching the splice on the exterior side.

In another embodiment, a method for manufacturing structural joints includes creating a plug from a sandwich material comprising a core between a first skin and a second skin, the first skin having a greater surface areas than the second skin, creating a splice from a skin, and creating a structural joint between a first and second panel, the panels including a recess complementary to the plug for receiving the plug when the panels are joined for assembly, the splice attached to the first and second panels opposite the recess, the plug and splice securely joining the first and second panels.

In a further embodiment, a system for providing a structural joint includes a panel assembly including a first panel and a second panel, the panel assembly further including an interior recess formed by adjacent edge portions of the first and second panels, and an exterior side opposite from the interior recess, a plug inserted into the interior recess, the plug including a cap that extends beyond the interior recess and overlaps the first and second panel, and a splice attached to the exterior side.

The features, functions, and advantages can be achieved independently in various embodiments of the present inventions or may be combined in yet other embodiments.

BRIEF DESCRIPTION OF THE DRAWINGS

Embodiments of techniques in accordance with the present disclosure are described in detail below with reference to the following drawings.

DETAILED DESCRIPTION

Techniques for providing a fastener-free primary structural joint for sandwich panels are described herein. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
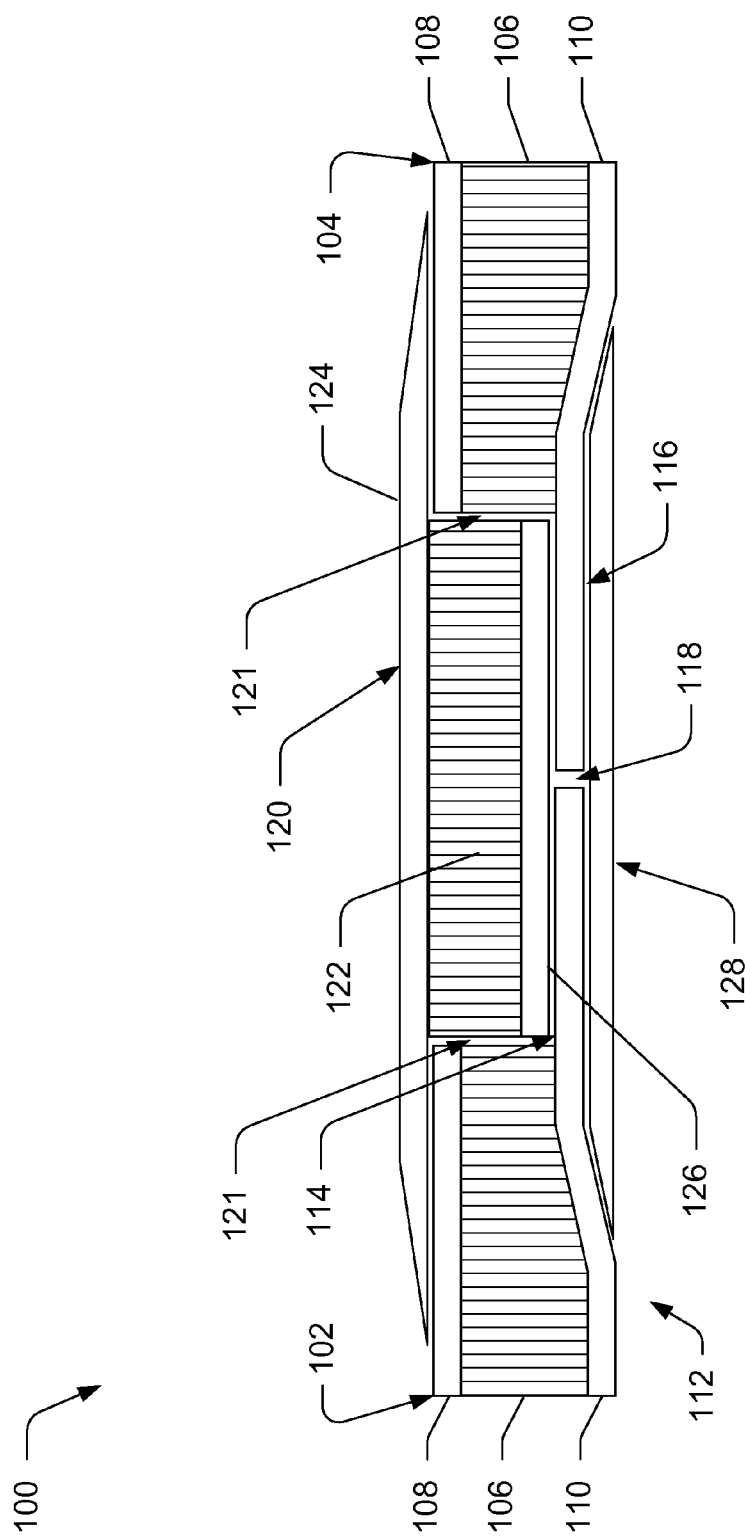
FIG. 1 is a cross-sectional view of a fastener-free primary structural joint for sandwich panels in accordance with an embodiment of the invention.

FIG. 1 illustrates a cross-sectional view of a fastener-free primary structural joint 100 for sandwich panels in accordance with an embodiment of the invention. The joint 100 may include a first panel 102 and a second panel 104. The first panel 102 and the second panel 104 may have a complementary design. For example, the first panel 102 and the second panel 104 may be substantial mirror copies of each other, thus the first panel 102 may have substantially the same contour as the second panel 104. In alternate embodiments, the panels 102, 104 may have different contours.

The panels 102, 104 may be sandwich panels. In some embodiments, the panels 102, 104 may include a core 106 situated between an interior skin 108 and an exterior skin 110. The core 106 may be secured between the skins 108, 110 by an adhesive or other bonding agent. The core 106 may be a foam material that includes a relatively low density value therefore having properties of reduced weight, thereby creating efficiencies in aviation applications, while including considerable resistance to compressive forces. In some embodiments, the interior skin 108 and exterior skin 110 may be the same material. For example, the core 106 may be a Nomex-type honeycomb core and the interior skin 108 and the exterior skin 110 may be carbon epoxy face sheets. In other embodiments, the exterior skin 110 may be a different material than the interior skin 108, such as the exterior skin 110 may include a polished surface material ideal for reducing unintended drag when exposed to outside airflow during a flight of an aircraft while the interior skin 108 may include properties to enhance attachment of other components.

The first panel 102 and the second panel 104 may be positioned as a panel assembly 112. The panel assembly 112 includes the panels 102, 104 situated in their design orientation after assembly or joining of the panels has occurred. The panel assembly 112 may define an interior recess 114 and an exterior recess 116. In some embodiments, the interior recess 114 includes a depth substantially equivalent to the thickness of the core 106. The interior recess 114 may be formed by machining the panels to remove the core 106 from the panels 102, 104; by creating panels 102, 104 including the interior recess 114 in the form; or by removing the core 106 in other processes such as by utilizing releasing agents. The interior recess 114 may further include an outlet gap 118 between the panels 102, 104. The outlet gap 118 provides an outlet for air, adhesive, or other elements during an assembly process, as described below.

The joint 100 may further include a plug 120. The plug 120 may include a structure substantially similar to the panels 102, 104. For example, the plug 120 may include a plug core 122 secured between a plug interior skin 124 and a plug exterior skin 126. The plug core 122 may be secured between the plug skins 124, 126 by an adhesive or other bonding agent. In some embodiments, the plug 120 may be composed of substantially the same materials as the panels 102, 104. In an exemplary embodiment, the plug core 122 and the plug exterior skin 126 are shaped complementary to the interior recess 114, such that when the plug core 122 and plug exterior skin 126 are inserted into the interior recess 114, only a small gap 121 remains around the perimeter of the plug 120. The small gap 121 surrounding the perimeter of the plug 120 may be designed to accommodate an optimum application of adhesive or bonding material for joining the plug 120 and panel assembly 112.

Preferably, the interior skin 124 extends beyond the interior recess 114 formed by the panel assembly 112. Therefore, when the plug 120 is inserted into the panel assembly 112, the plug interior skin 124 completely covers the interior recess 114, and extends beyond the interior recess 114 to partially overlap the adjacent first and second panels 102, 104. The interior skin 124 may prevent water or other contaminates from entering the interior recess 114 after assembly of the plug 120 and the panel assembly 112.

The plug 120 may be inserted into the interior recess 114 and secured to the panel assembly 112 with an adhesive or bonding agent disposed within the gap 121, such as Hysol EA-9394 room temperature paste adhesive manufactured by the Dexter Corporation of Windsor Locks, Conn. In some embodiments, the attachment of the plug 120 and the panel assembly 112 may require a curing agent, clamps, or similar apparatus to secure the plug and panel assembly until a secure bond is realized.

The joint 100 may further include a splice 128. The splice 128 may be composed of the same, or substantially the same material as the exterior skin 110. The splice 128 may be designed in a complementary shape for the exterior recess 116, therefore creating a smooth and continuous exterior surface when the splice 128 is attached to the panel assembly 112. For example, the splice 128 may be exposed to airflow external to an aircraft, therefore necessitating a smooth and continuous contour from the first panel 102 to the splice 128 to the second panel 104, therefore creating minimal drag or airflow disturbance.

The splice 128 may be inserted into the exterior recess 116 and secured to the panel assembly 112 with an adhesive or bonding agent. In some embodiments, the joining of the splice 128 and the panel assembly 112 may require a curing agent, clamps, or similar apparatus to securely position the splice and panel assembly in position until a secure bond is realized.

In other embodiments, the splice 128 may be attached across a substantially planar surface of the exterior skin 110 of the panel assembly 112, therefore creating a non-continuous or non-contoured surface. For example, in applications where aerodynamics are not important, such as in building construction applications, a smooth continuous or contoured surface may not be important and may result in additional unnecessary cost or time during assembly or manufacturing of the structural joint 100.

Figure 2:
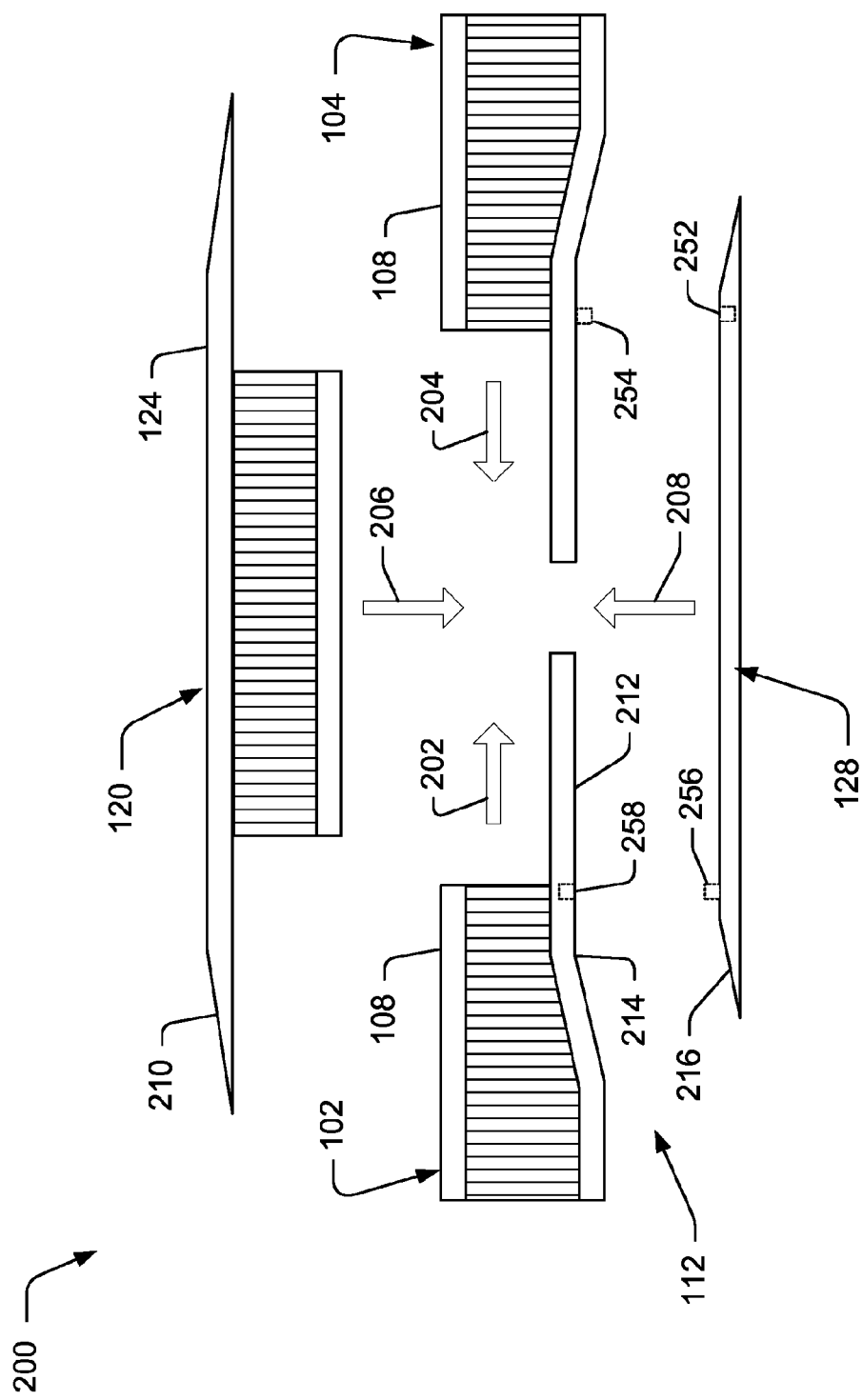
FIG. 2 is an exploded view of the fastener-free primary structural joint for sandwich panels illustrated in FIG. 1.

FIG. 2 is an exploded view 200 of the fastener-free primary structural joint 100 for sandwich panels illustrated in FIG. 1. As illustrated, the first panel 102 and the second panel 104 are moved along a first direction 202 and a second direction 204 in an assembly process, respectively, to create the panel assembly 112. Similarly, the plug 120 may be inserted into the panel assembly 112 along an insertion direction 206, and the splice 128 may be attached to the panel assembly 112 in an attachment direction 208.

The plug 120 may include contoured plug edges 210 on the plug interior skin 124. In some embodiments, the exposed surface of the plug interior skin 124 may include a gradual slope forming the contoured plug edges 210 near the outer edges of the plug interior skin 124 to create a relatively smooth junction with the interior skin 108 of the panels 102, 104. One should appreciate that the actual thickness of the interior skin 108 and the exterior skin 110 may be significantly less than the thickness of the core 106. The contoured plug edges 210 may protect the plug interior skin 124 from damage and further prevent contaminants from penetrating between the plug interior surface 124 and the interior skin 108 of the panels 102, 104.

The panels 102, 104 may include a ramped surface 212 with a ramped angle 214. The ramped surface 212 may create the exterior recess 116 to accommodate the attachment of the splice 128. The splice 128 may include an angled splice edge 216 complementary to the ramped angle 214 of the ramped surface 212. For example, the splice 128 may be attached into the exterior recess 116 formed by the ramp surface 212 while maintaining a smooth continuous and contoured surface for minimal aerodynamic drag or airflow disturbance across the exterior skin 110 of the first panel 102, the splice 128, and the exterior skin 110 of the second panel 104. In an exemplary embodiment, the angled splice edge splice 216 may be substantially parallel with the ramping angle 214 while the ramped surface 212 may be substantially parallel to surface of the splice 128 when the splice is attached to the panel assembly 112. In other embodiments, additional complementary contours may be included on the panels 102, 104, particularly in the ramped surface 212, to properly align the splice 128 during an assembly process. For example, the splice 128 may include one or more grooves 252 (shown in dotted lines) near the angled splice edge 216 that may mate with a complementary feature (or projection, protuberance, etc.) 254 on the panels 102, 104 when the splice is properly aligned on the panel assembly 112 during assembly of the structural joint 100. Alternately, an alignment member 256 may project outwardly from the slice 128 and may engage a corresponding alignment recess 258 disposed within one or more of the panels. In further embodiments, any suitable arrangements of alignment members may be employed.

Figure 3:
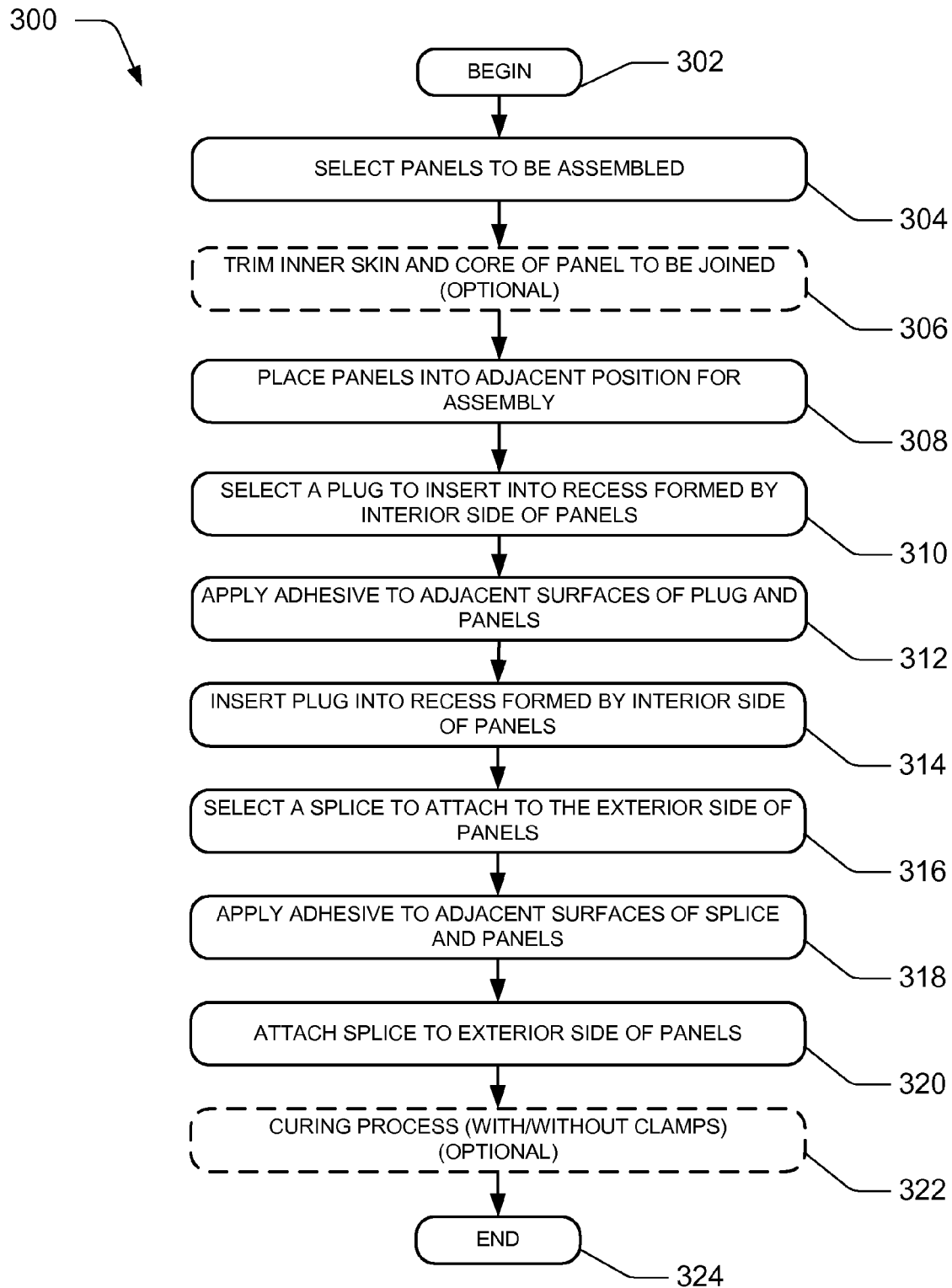
FIG. 3 is a flow diagram of a process for assembling a fastener-free primary structural joint for sandwich panels in accordance with yet another embodiment of the invention.

FIG. 3 is a flow diagram of a process 300 for assembling a fastener-free primary structural joint for sandwich panels in accordance with yet another embodiment of the invention. The process 300 begins at a block 302. At a block 304, the panels to be assembled are selected, such as panels 102, 104. In some embodiments, the panels may be designed for assembly with a unique complementary panel, such as in aviation assembly where each panel may include a distinct contour.

At an optional block 306, the panels may be trimmed or otherwise prepared before they are joined in an assembly. For example, the panels 102, 104 may include a removable core portion in the interior recess 114, such that the removable core portion is removed at the optional block 306. In other embodiments, the panels 102, 104 may be created or manufactured with the core 106 and skins 108, 110 ready for assembly without removing or trimming the panels 102, 104. At a block 308, the panels are placed into an adjacent position for assembly, such as the intended assembled panel position.

At a block 310, a plug is selected for insertion into the recess formed by the interior side of the panels. In some embodiments, the plug may be designed for a particular joint assembly. The plug may also require removal of a portion of the plug core 122 or trimming of the plug interior surface 124 before insertion of the plug into the recess 116 formed by the panel assembly 112. At a block 312, adhesive may be applied to the adjacent surfaces of the plug and panel assembly. For example, the underside of the plug interior surface 124, the plug exterior skin 126, and any surfaces exposed on the panel assembly 112 in the interior recess 114 may have adhesive applied to them at the block 312. At a block 314, the plug is inserted into the recess formed by the interior side of the panels. After the plug is inserted at the block 314, some adhesive may necessitate removal. For example, some adhesive may be forced through the outlet gap 118 and/or out gaps near the contoured plug edges 210 and need to be removed.

At a block 316, a splice is selected for attachment to the exterior side of the panels. In some embodiments, the splice may be selected for insertion into the exterior recess 116 of the panel assembly 112 at the block 316. At a block 318, adhesive is applied to the adjacent surfaces of the splice and panel assembly. For example, adhesive may be applied to the surfaces of the panel assembly 112 exposed by the exterior recess 116 and the underside of the splice 128 adjacent to the exterior recess 116. At a block 320, the splice is attached to the exterior side of the panel assembly 112. For example, the splice 128 may be inserted into the exterior recess 116. If the splice 128 is configured with an alignment mechanism (e.g. a groove, protuberance, etc.) then at block 320, the alignment mechanism may be aligned with its counterpart mechanism on the adjacent panel of the panel assembly 112. If excess adhesive is present, it may necessitate removal from the splice 128 or panel assembly 112.

In some embodiments, an adhesive or bonding agent may require curing time. Therefore, a curing process is performed at block 322. In some embodiments, the curing process includes the application of heat and pressure to the panel assembly according to a carefully controlled curing process. Clamps or other securing mechanisms may be used to maintain the assembly of the structural joint 100 during the curing process at the optional block 322. Alternatively, adhesives with relatively quick bonding times may not require the use of securing mechanisms. At a block 324, the process 300 ends.

Although the process 300 illustrates attachment of the plug 120 and the splice 128 to the panel assembly 112 using an adhesive or bonding agent, other means of attachment may be utilized while remaining within the spirit and scope of the present disclosure. For example, a plurality of snaps or locking features may be included on the mating surfaces of the plug 120, the splice 128, and the panel assembly 112 to facilitate assembly of the structural joint 100.

Figure 4:
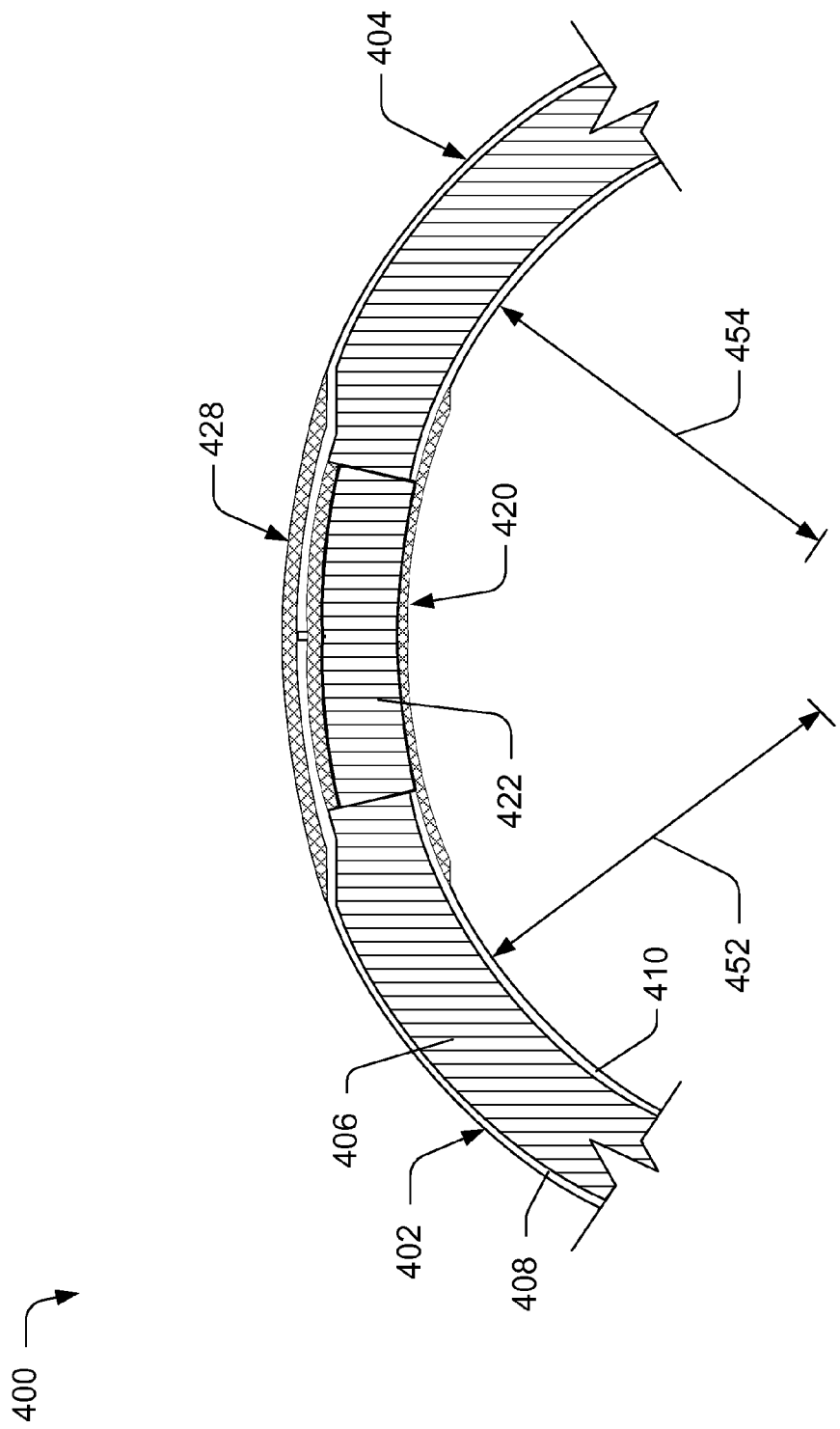
FIG. 4 is a plan view of a fastener-free primary contoured structural joint for sandwich panels in accordance with an embodiment of the invention.

FIG. 4 is a plan view of fastener-free primary contoured structural joint 400 for sandwich panels in accordance with an embodiment of the invention. In this embodiment, the contoured joint 400 includes first and second panels 402, 404, a contoured plug 420, and a contoured splice 428. Except for being contoured, many of the aspects of these components are substantially similar to the non-contoured embodiments described above with respect to FIGS. 1-3, and for the sake of brevity, only significant differences will be described below.

The contoured structural joint 400 may include a number of radii that define a contour across the panels after assembly. For example, the first panel 402 may have a first radius 452 while the second panel 404 may have a second radius 454. The contoured plug 420 and the contoured splice 428 may include contours that create an approximately continuous contour between the panels 402, 404. For example, when a structural joint is created on the fuselage of an aircraft, the contoured structural joint 400 may be necessary to maintain the proper design requirements of the aircraft. Further, for more complex geometries, such as those included on aircraft wings, the contoured structural joint 400 may include corresponding complex contours across the contoured panels 402, 404, the contoured plug 420, and the contoured splice 428. It should also be appreciated that the thickness of a panel core 406, plug core 422, and skins 408, 410 may vary based on the application of the contoured structural joint 400, such as they may vary across any distance within the contoured structural joint.

Figure 5:
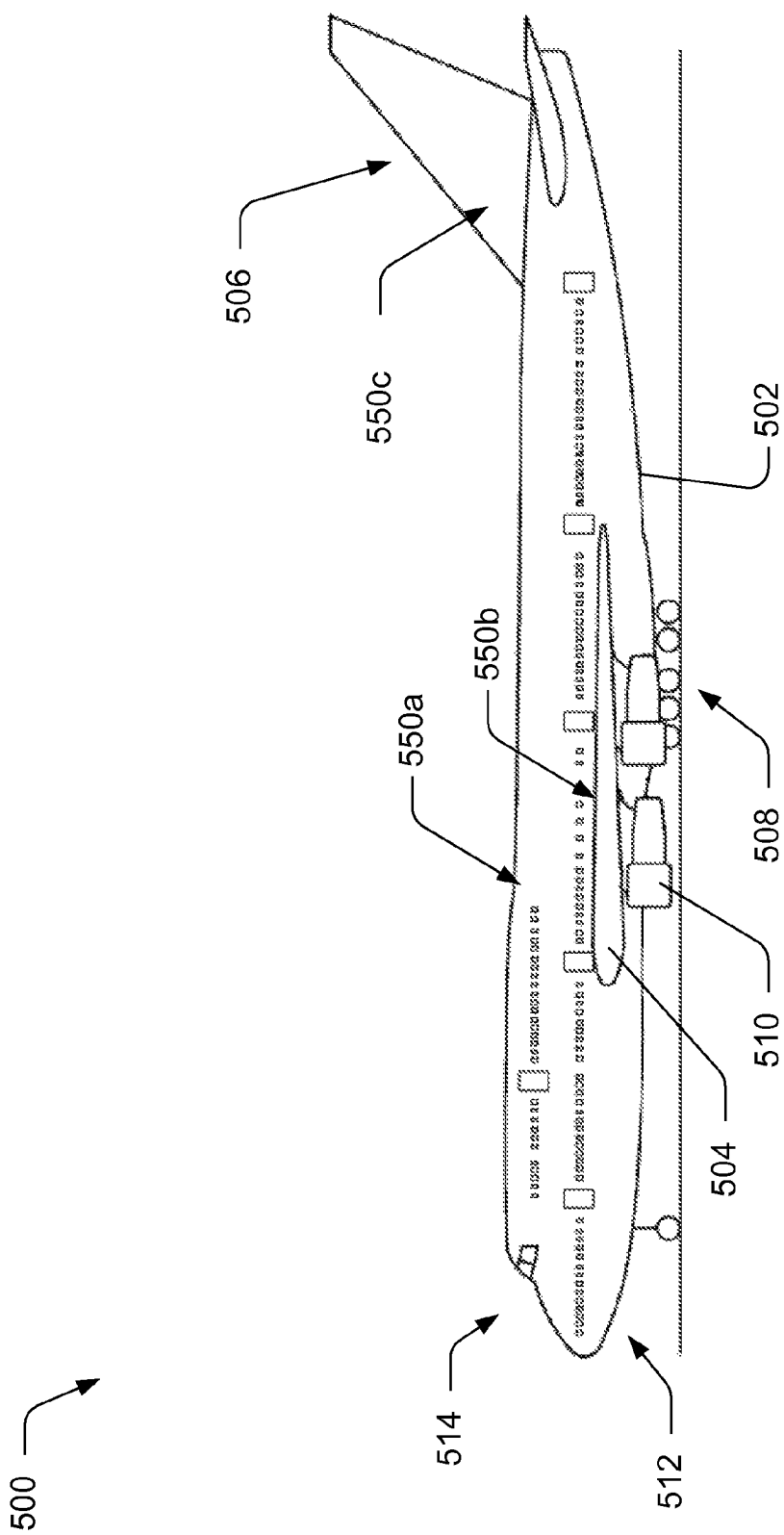
FIG. 5 is a side elevational view of an aircraft utilizing fastener-free primary structural joints for sandwich panels in accordance with yet another embodiment of the invention.

FIG. 5 is a side elevational view of an aircraft 500 utilizing fastener-free primary structural joints 550 for sandwich panels in accordance with yet another embodiment of the invention. One may appreciate that embodiments of structural joint may be employed in a wide variety of locations, including the fuselage, body, walls, and other exterior locations on movable platforms such as motor vehicles, aircraft, maritime vessels, or spacecraft, or other suitable applications including applications of building or product construction where panels are joined to create a structural joint. For example, an aircraft 500 may have one or more fastener-free primary structural joints 550 for sandwich panels in accordance with an embodiment of the invention.

In this embodiment, the aircraft 500 includes a fuselage 502 including wing assemblies 504, a tail assembly 506, and a landing assembly 508. The aircraft 500 further includes one or more propulsion units 510, a control system 512 (not visible), and a host of other systems and subsystems that enable proper operation of the aircraft 500. One should appreciate that embodiments of the fastener-free primary structural joints for sandwich panels may be employed in any suitable portion of the aircraft 500, such as in a fuselage 502 (550a), wing assemblies 504 (550b), tail assembly 506 (550c), and any other suitable areas of the aircraft 500. In general, except for the fastener-free primary structural joints for sandwich panel in accordance with embodiments of the invention, the various components and subsystems of the aircraft 500 may be of known construction and, for the sake of brevity, will not be described in detail herein.

Although the aircraft 500 shown in FIG. 5 is generally representative of a commercial passenger aircraft, including, for example, the 737, 747, 757, 767, 777, and 787 models commercially available from The Boeing Company of Chicago, Ill., the inventive apparatus and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for assembling panels with a fastenerless joint, the method comprising:
    positioning a first panel having a first edge portion proximate a second panel having a second edge portion to create a panel assembly such that the first and second edge portions cooperatively form an interior recess on an interior side of the panel assembly and an exterior recess on an exterior side opposite the interior side;
    applying adhesive to at least one of the recessed interior side of the panel assembly and a plug configured to occupy the interior recess;
    inserting the plug into the interior recess, the plug including a core situated between a first skin and a second skin, the first skin creating a cap that extends beyond the interior recess and overlaps adjacent portions of the first and second panels, and the second skin overlapping the first and second edge portions of the panel assembly;
    applying adhesive to at least one of a splice and an exterior side opposite from the interior side; and
    attaching the splice on the exterior side with the adhesive and without additional fasteners by inserting the splice in the exterior recess.

2. The method of claim 1, wherein an exterior profile of the first and second panels and the splice create a substantially smooth surface with approximately minimal airflow disturbance during flight.

3. The method of claim 1 further comprising, removing material from the first and second panels to create one of the interior recess and an exterior recess approximately opposite from the interior recess.

4. The method of claim 1, wherein attaching the splice includes aligning a first alignment mechanism formed on the splice with a second alignment mechanism formed on at least one of the first and second edge portions.

5. The method of claim 1, further comprising tapering an edge of the cap to create contoured edges that create a continuous surface between the panel assembly and the plug.

6. The method of claim 1, wherein the splice includes an angled splice edge that tapers down from a first width to a second width of the splice.

7. The method of claim 1 further comprising:
    removing excessive adhesive from the panel assembly; and
    applying a restraint against a portion of the panel assembly during a curing process.

8. A method for manufacturing a fastener-free primary structural joint for sandwich panels, comprising:
    creating a plug from a prefabricated sandwich material comprising a core between a first skin and a second skin, the first skin having a greater surface area than the second skin;
    creating a splice by tapering at least two edges of a skin;
    creating a first and second panel that, when joined along a common edge, form a first recess complementary to the plug and a second recess opposite the first recess and complementary to the splice;
    joining the first and second panel to create the first recess and the second recess;
    attaching the plug in to the first recess with an adhesive; and
    attaching the spice in the second recess with the adhesive.

9. The method of claim 8 further comprising, creating a minimally ramped panel to provide a recess for the splice along the exterior contour of the assembly conforming to aerodynamic design requirements.

10. The method of claim 8, wherein the first and second panels create a portion of at least one of an aircraft fuselage or aircraft wing.

11. The method of claim 8, wherein the first and second panels include at least one of a honeycomb core and carbon epoxy skins.

12. The method of claim 8, wherein securely joining the first and second panels does not include fasteners.

13. A joint system, comprising:
    a panel assembly comprising a first panel positioned adjacent to a second panel along an edge of the first and second panel, the first and second panels, when mated, forming an interior recess along an interior side of the panel assembly and across the edge between the first and second panels and forming an exterior recess opposite the interior recess, the panel assembly further including an interior recess opposite from the interior recess;
    a plug inserted into the interior recess, the plug including a prefabricated sandwich panel having a core situated between a first skin and a second skin, the first skin creating a cap that extends beyond the interior recess and overlaps the first and second panel, the plug affixed to the panel assembly with adhesive and without fasteners; and
    a splice affixed within the exterior recess with the adhesive and without fasteners.

14. The system of claim 13, wherein the splice includes tapered edges and the exterior recess includes complementary tapered features such that the shape of the recess conforms to the shape of the splice.

15. The system of claim 13, wherein the first panel and the second panel include a honeycomb core between two skins, the skins exposed on the interior and exterior surfaces.

16. The system of claim 15, wherein the skin is carbon epoxy.

17. The system of claim 13, wherein the splice includes a alignment protrusion formed on the splice for mating with a alignment cavity formed on the exterior side.

18. The system of claim 13, wherein the cap includes tapered edges that create a continuous surface between the panel assembly and the plug.

19. The system of claim 13, wherein the panel assembly is included on an aircraft.

* * * * *